US012637233B2

(12) United States Patent
Sauer

(10) Patent No.: US 12,637,233 B2
(45) Date of Patent: *May 26, 2026

(54) METEOROLOGICAL EQUIPMENT TO SUPPORT FLIGHT OPERATIONS OF VERTICAL TAKEOFF AND LANDING AIRCRAFT

(71) Applicant: The Boeing Company, Chicago, IL (US)

(72) Inventor: Manuela Sauer, Lucerne (CH)

(73) Assignee: The Boeing Company, Arlington, VA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/738,299

(22) Filed: Jun. 10, 2024

(65) Prior Publication Data

US 2024/0327029 A1 Oct. 3, 2024

Related U.S. Application Data

(63) Continuation of application No. 17/652,601, filed on Feb. 25, 2022, now Pat. No. 12,043,410.

(51) Int. Cl.
*G08B 21/00* (2006.01)
*B64D 45/08* (2006.01)
(Continued)

(52) U.S. Cl.
CPC ............... *B64D 45/08* (2013.01); *G01P 5/24* (2013.01); *G01P 13/045* (2013.01); *G01S 17/95* (2013.01); *G01W 1/02* (2013.01); *G08G 5/76* (2025.01)

(58) Field of Classification Search
CPC B64D 45/08; B64D 43/00; G01P 5/24; G01P 13/045; G01S 17/95; G01S 13/862;
(Continued)

(56) References Cited

U.S. PATENT DOCUMENTS 9,395,438 B1 * 7/2016 Woodell ................. B64D 45/00
9,535,158 B1 1/2017 Breiholz et al.
(Continued)

FOREIGN PATENT DOCUMENTS

CN 108459359 A 8/2018

OTHER PUBLICATIONS

"Designing a scalable vertiport", Lilium, Jul. 2020, pp. 1-6.
(Continued)

*Primary Examiner* — Tai T Nguyen
(74) *Attorney, Agent, or Firm* — Harrity & Harrity, LLP

(57) ABSTRACT

A method is provided for supporting flight operations of vertical takeoff and landing (VTOL) aircraft in an urban air mobility (UAM) environment that includes a vertiport. The method includes accessing first observed weather data obtained by sensors located on-site at the vertiport and second observed weather data obtained by sensors onboard VTOL aircraft. A data fusion is performed to integrate the first observed weather data and the second observed weather data to produce a collection of weather data that describes the weather in an environment of the vertiport, and an environment of the VTOL aircraft. And a weather map is produced based on the collection of weather data, the weather map illustrating one or more meteorological features of the weather in the environment of the vertiport and/or the VTOL aircraft, the weather map produced for use in supporting flight operations of the VTOL aircraft.

20 Claims, 9 Drawing Sheets

(51) Int. Cl.

| | |
|---|---|
| *G01P 5/24* | (2006.01) |
| *G01P 13/04* | (2006.01) |
| *G01S 17/95* | (2006.01) |
| *G01W 1/02* | (2006.01) |
| *G08G 5/76* | (2025.01) |

(58) Field of Classification Search
CPC ........ G01S 13/865; G01S 15/58; G01S 13/95; G01S 15/885; G01W 1/02; G08G 5/76; G08G 5/57; G08G 5/21; G08G 5/22; G08G 5/26; G08G 5/34; G08G 5/55
USPC ........................................................ 340/945
See application file for complete search history.

(56) References Cited

U.S. PATENT DOCUMENTS

| | | | | |
|---|---|---|---|---|
| 9,869,766 | B1 | 1/2018 | Breiholz et al. | |
| 9,959,771 | B1 * | 5/2018 | Carlson .................... | G08G 5/57 |
| 10,494,108 | B1 | 12/2019 | Finley et al. | |
| 11,187,800 | B1 * | 11/2021 | Fersdahl ................... | G01S 7/06 |
| 11,493,938 | B1 | 11/2022 | Harris et al. | |
| 2004/0239550 | A1 | 12/2004 | Daly, Jr. | |
| 2017/0177006 | A1 | 6/2017 | Fisher et al. | |
| 2021/0032820 | A1 | 2/2021 | Sarpotdar et al. | |
| 2022/0341709 | A1 | 10/2022 | Winslow | |
| 2022/0343768 | A1 * | 10/2022 | Di Cosola ................ | G08G 5/55 |
| 2024/0059167 | A1 * | 2/2024 | Fisher .................... | B60L 53/51 |

OTHER PUBLICATIONS

McNabb, "What is a Vertiport? NUAIR Brings Industry Players Together to Develop Advanced Air Mobility Strategies", Dronelife, Mar. 2021, pp. 1-3.

* cited by examiner

TEMP 318

HUMIDITY 320

PRESSURE 322

LIDAR 324

VERTIPORT 210

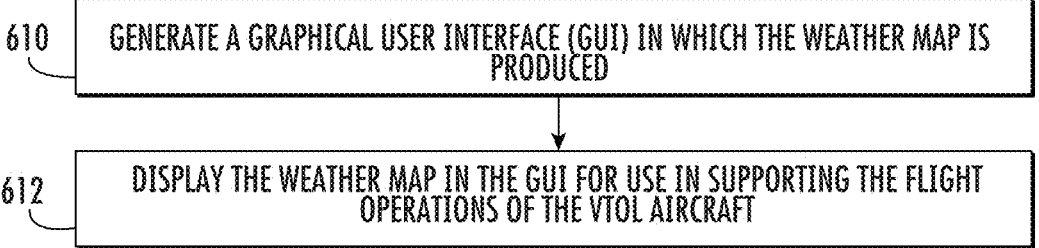

610 | GENERATE A GRAPHICAL USER INTERFACE (GUI) IN WHICH THE WEATHER MAP IS PRODUCED

612 | DISPLAY THE WEATHER MAP IN THE GUI FOR USE IN SUPPORTING THE FLIGHT OPERATIONS OF THE VTOL AIRCRAFT

FIG. 6B

614 | DETERMINE FEASIBILITY OF THE FLIGHT OPERATIONS IN THE ENVIRONMENT OF THE VTOL AIRCRAFT BASED ON THE COLLECTION OF WEATHER DATA

FIG. 6C

616 | DETERMINE A RISK OF ICING ON THE VTOL AIRCRAFT BASED ON THE COLLECTION OF WEATHER DATA

FIG. 6D

618   ACCESS THIRD WEATHER DATA FOR THE UAM ENVIRONMENT, AND THAT IS AT LEAST ONE OF OBSERVED OR FORECASTED INFORMATION

FIG. 6E

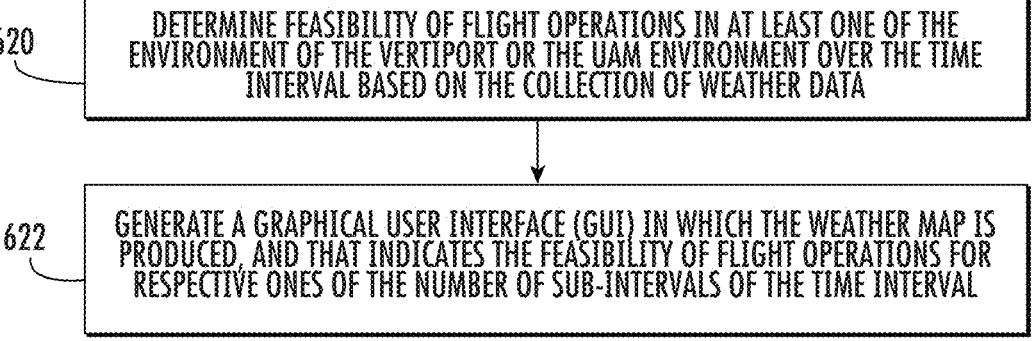

620   DETERMINE FEASIBILITY OF FLIGHT OPERATIONS IN AT LEAST ONE OF THE ENVIRONMENT OF THE VERTIPORT OR THE UAM ENVIRONMENT OVER THE TIME INTERVAL BASED ON THE COLLECTION OF WEATHER DATA

622   GENERATE A GRAPHICAL USER INTERFACE (GUI) IN WHICH THE WEATHER MAP IS PRODUCED, AND THAT INDICATES THE FEASIBILITY OF FLIGHT OPERATIONS FOR RESPECTIVE ONES OF THE NUMBER OF SUB-INTERVALS OF THE TIME INTERVAL

FIG. 6F

METEOROLOGICAL EQUIPMENT TO SUPPORT FLIGHT OPERATIONS OF VERTICAL TAKEOFF AND LANDING AIRCRAFT

CROSS-REFERENCE TO RELATED APPLICATIONS

This application is a continuation of U.S. patent application Ser. No. 17/652,601, filed on Feb. 25, 2022, now U.S. Pat. No. 12,043,410, which is hereby incorporated by reference in its entirety.

TECHNOLOGICAL FIELD

The present disclosure relates generally to robotics and, in particular, to one or more of the design, construction, operation or use of autonomous or semi-autonomous vehicles such as vertical takeoff and landing (VTOL) aircraft in an urban air mobility (UAM) environment.

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses. One focus in the field of robotics is in the deployment of vertical takeoff and landing (VTOL) aircraft in an urban air mobility (UAM) environment.

The support of flight operations for aircraft that takeoff and land at airports often involves up-to-date, accurate meteorological information that includes wind speed and direction, visibility, present weather, cloud amount and height of base, temperature and dew point and air pressure usually reported by automatic stations or a human observer as so called METAR (Meteorological Aerodrome Report) in intervals of 30 minutes. The decision whether or not operations are possible in and out of a specific airport is usually made by a human operator at the airport. The individual pilot can then determine if it is safe for the aircraft to follow the original plan, especially to land in the experienced conditions onboard the aircraft. While the general Vertiport operations will still be overseen and coordinated by a human operator, the human situational awareness may not be given for VTOL aircraft in an UAM environment.

It would therefore be desirable to have a system and method that takes into account the local conditions and provides a remote operator with decision making support to tackle some of the issues discussed above, as well as other possible issues.

BRIEF SUMMARY

Example implementations of the present disclosure are directed to supporting flight operations of vertical takeoff and landing (VTOL) aircraft in an urban air mobility (UAM) environment that includes a vertiport. Relative to the meteorological information current commercial aircraft that takeoff and land at airports, more detailed information may be desirable for VTOL aircraft, including autonomous or semi-autonomous VTOL aircraft. This may be especially true for information on wakes and turbulences around and above the vertiport, as well as shear to be encountered enroute.

According to example implementations of the present disclosure, observed weather data may be obtained for environments of the VTOL aircraft and vertiport, and fused to produce a collection of weather data. In some examples, this may further include pre-run high resolution simulations of the wind field for the specific location and current weather situation. In addition to the wind field, the overall atmospheric condition throughout a network and at vertiports may be used to identify notable situations and to facilitate flight operations. In this regard, the collection of weather data may be used for educated decision making of the feasibility of flight operations, as well as for efficient fleet management including vehicle positioning at vertiports available for operations and for replanning of alternative means of travel.

The present disclosure thus includes, without limitation, the following example implementations.

Some example implementations provide a method of supporting flight operations of VTOL aircraft in an UAM environment that includes a vertiport, the method comprising: accessing first observed weather data obtained by sensors located on-site at the vertiport, the first observed weather data describing weather in an environment of the vertiport that is within the UAM environment; accessing second observed weather data obtained by sensors onboard VTOL aircraft, the second observed weather data describing the weather in the environment of the VTOL aircraft; performing a data fusion to integrate the first observed weather data and the second observed weather data to produce a collection of weather data that describes the weather in the environment of the vertiport, and the environment of the VTOL aircraft; and producing a weather map based on the collection of weather data, the weather map illustrating one or more meteorological features of the weather in at least one of the environment of the vertiport or the environment of the VTOL aircraft, the weather map produced for use in supporting flight operations of the VTOL aircraft.

Some example implementations provide an apparatus for supporting flight operations of VTOL aircraft in a UAM environment that includes a vertiport, the apparatus comprising a memory configured to store computer-readable program code; and processing circuitry configured to access the memory, and execute the computer-readable program code to cause the apparatus to at least perform the method of the preceding example implementation.

Some example implementations provide a computer-readable storage medium for supporting flight operations of VTOL aircraft in a UAM environment that includes a vertiport, the computer-readable storage medium being non-transitory and having computer-readable program code stored therein that, in response to execution by processing circuitry, causes an apparatus to at least perform the method of the preceding example implementation.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 2:
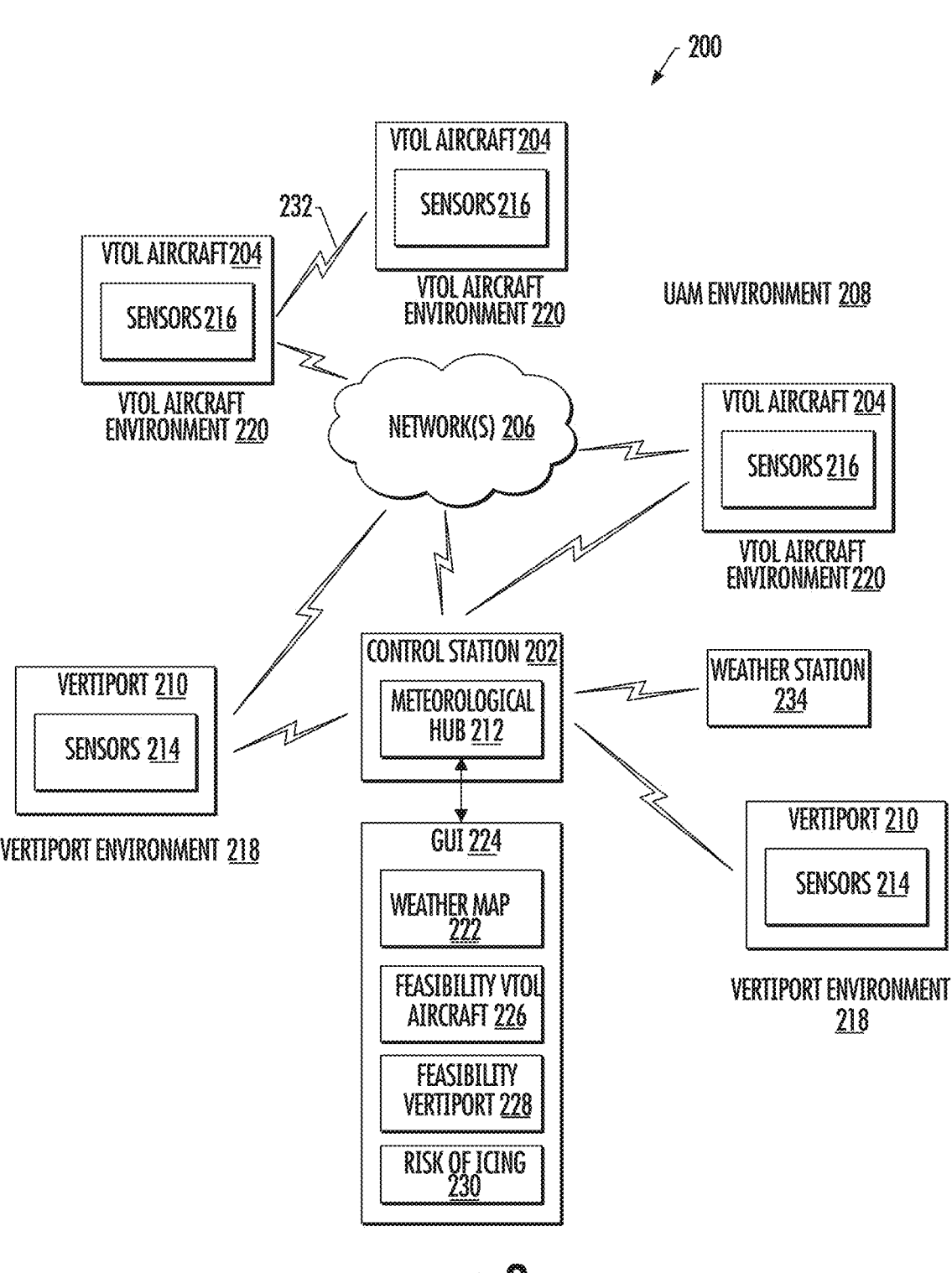
FIG. 2 illustrates a system according to some example implementations.
Figure 3:
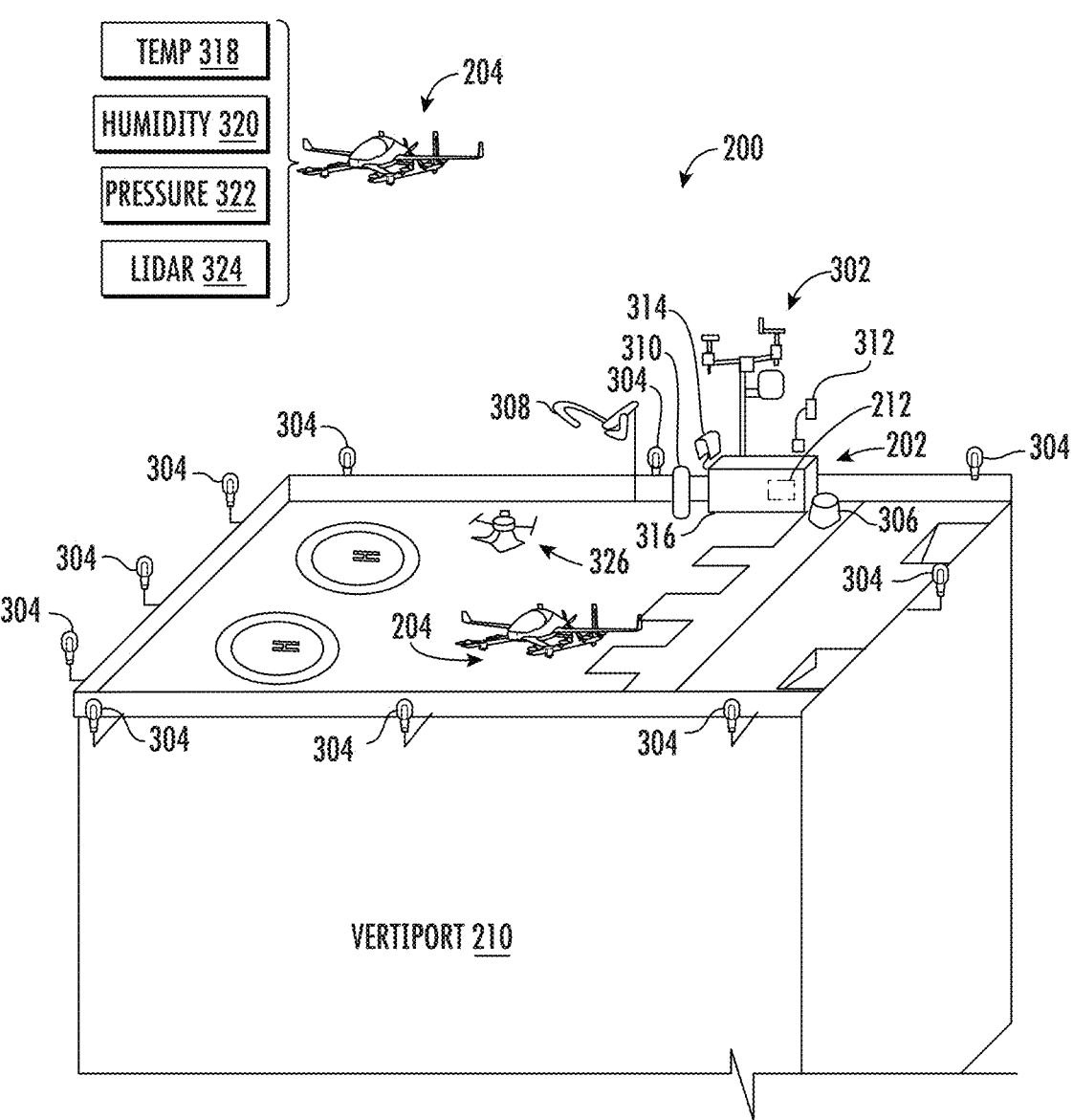
Figure 4:
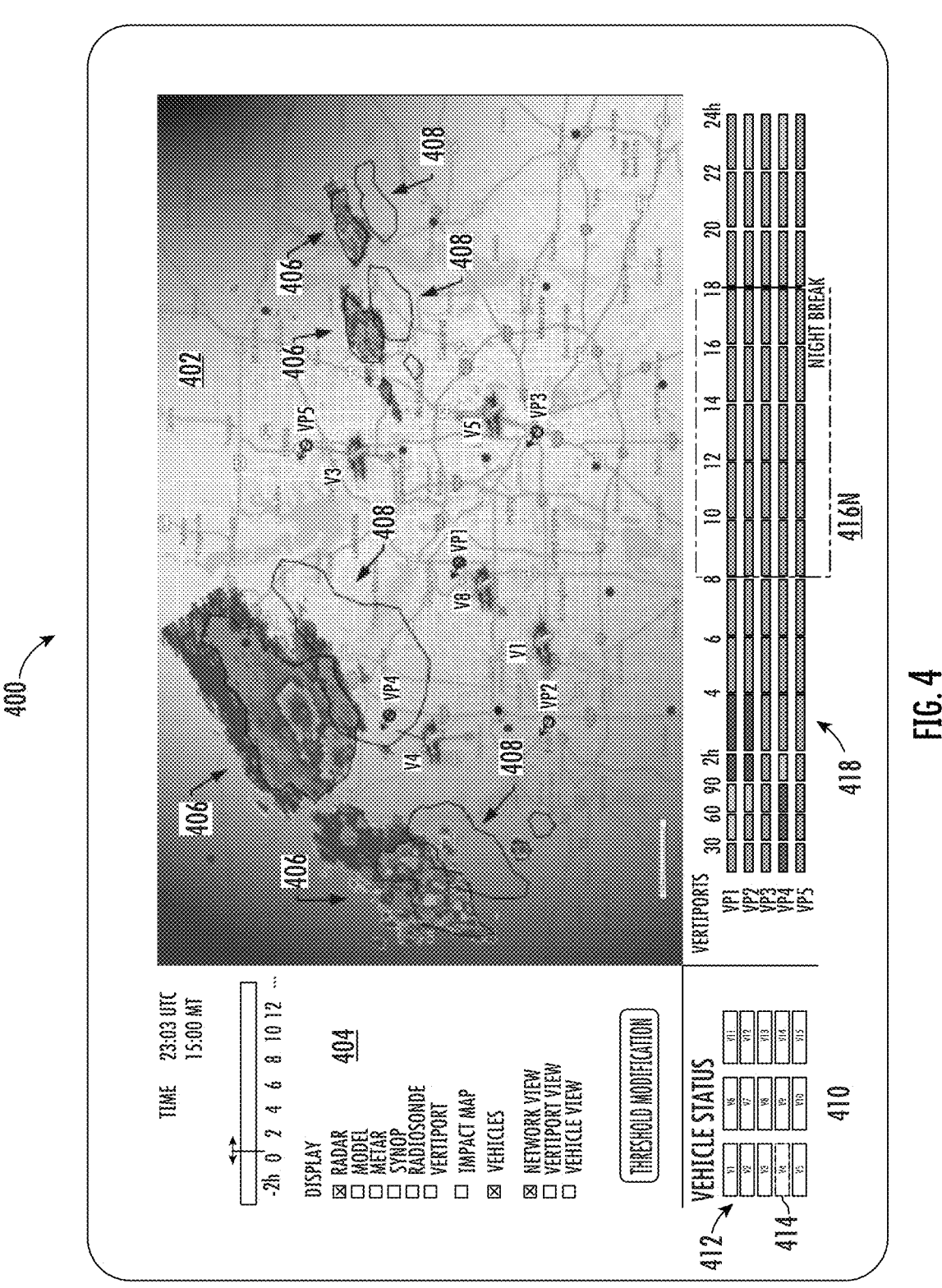
Figure 5:
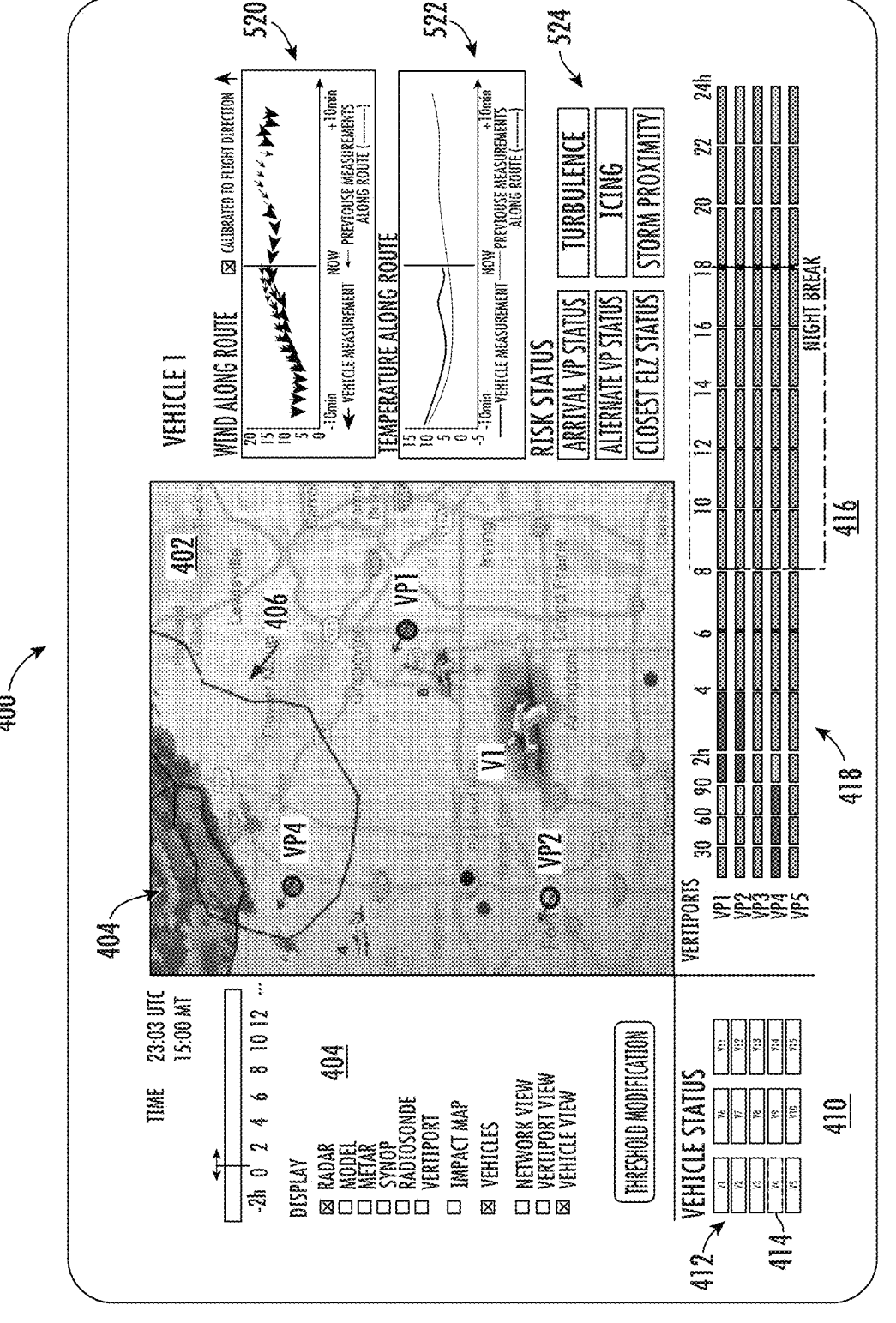
Figure 6A:
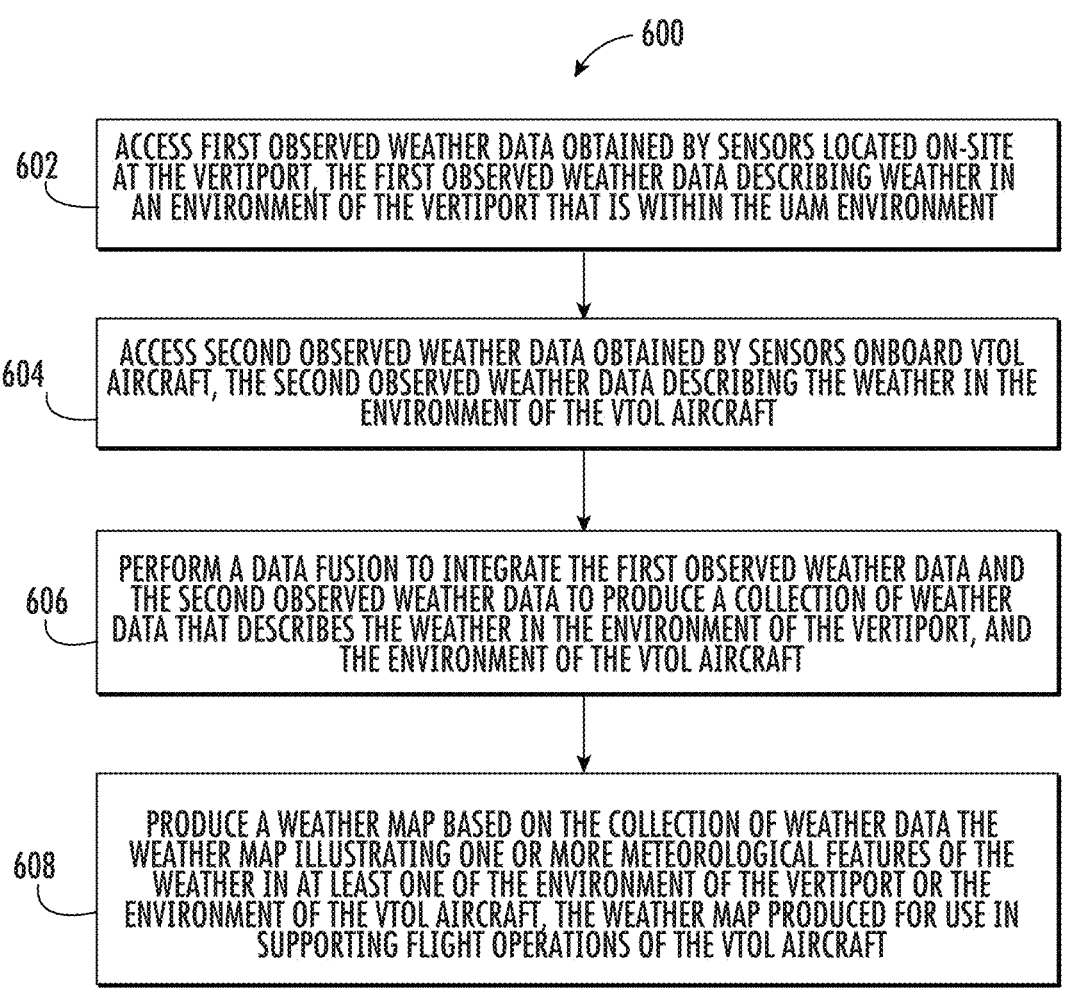
Figure 7:
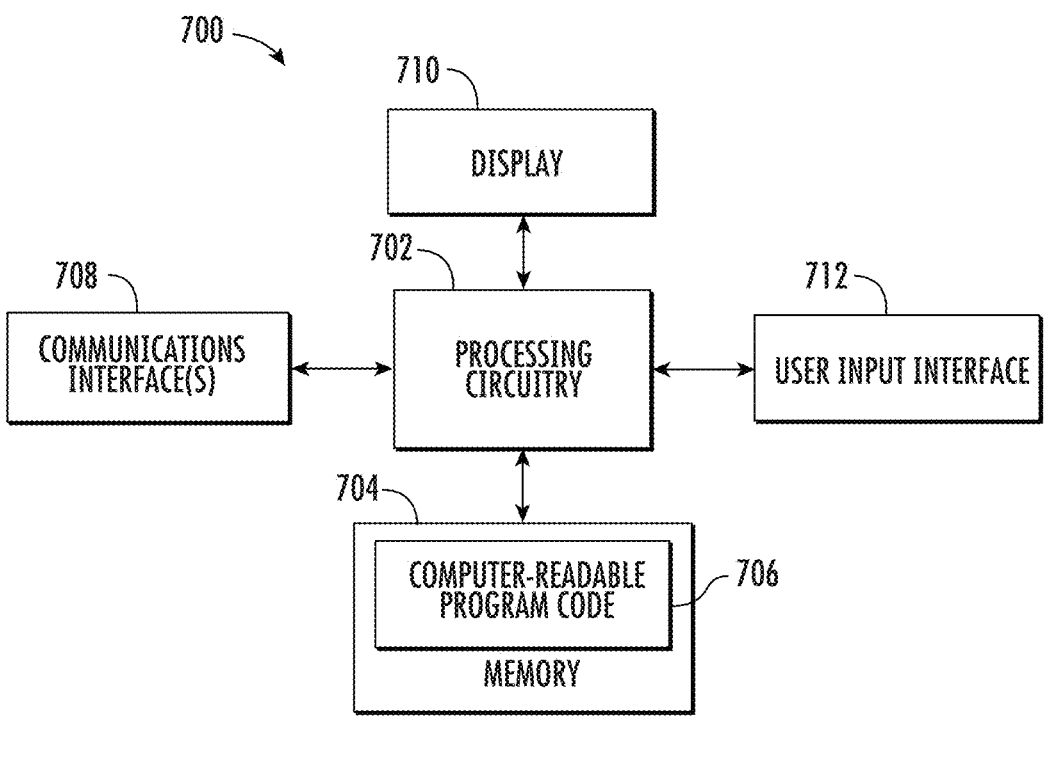

FIG. 3 more particularly illustrates various components of the system in FIG. 2, according to some example implementations;

FIGS. 4 and 5 illustrate a GUI that may be generated according to some example implementations of the present disclosure;

FIGS. 6A-6F are flowcharts illustrating various steps in a method of supporting flight operations of VTOL aircraft in a UAM environment that includes a vertiport, according to example implementations; and FIG. 7 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
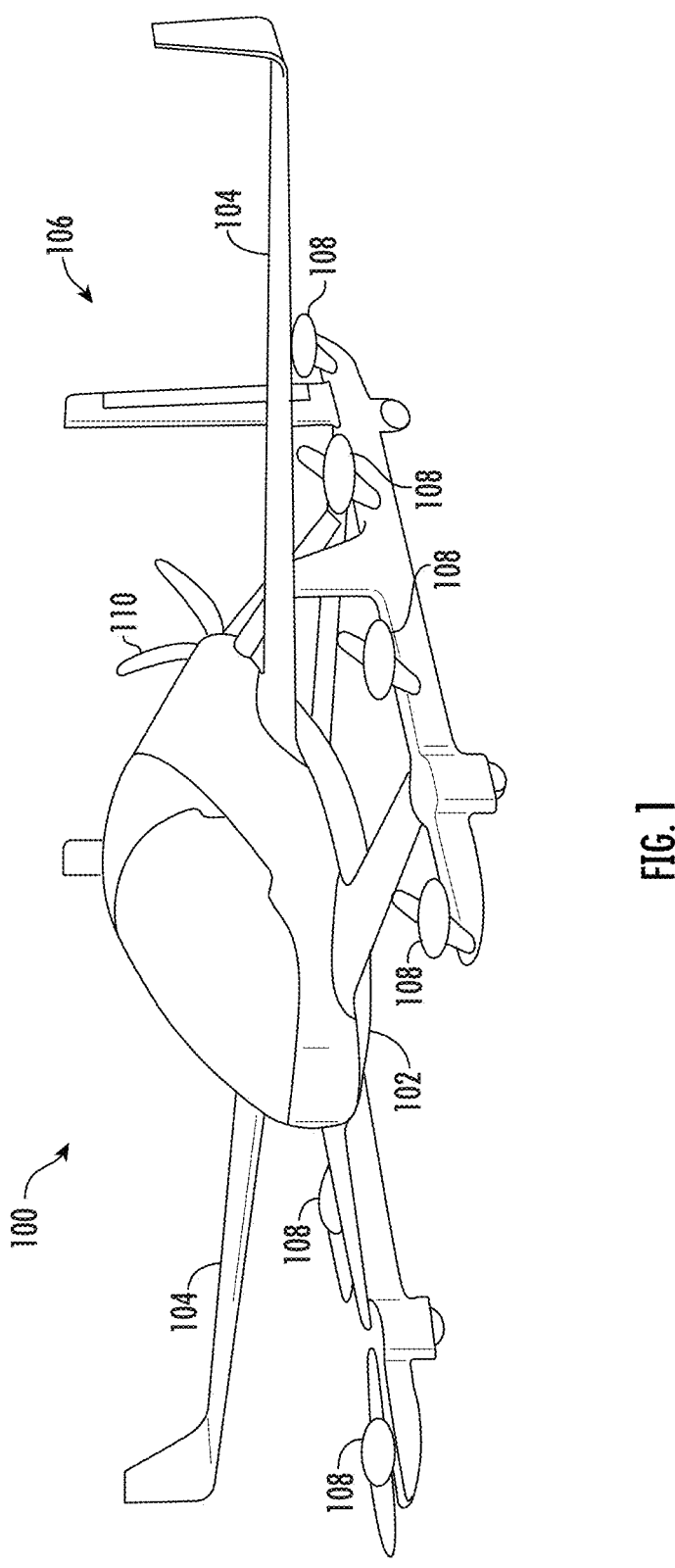
FIG. 1 illustrates one type of robot, namely, an unmanned aerial vehicle, that may benefit from example implementations of the present disclosure.

FIG. 1 illustrates one type of robot, namely, a vertical takeoff and landing (VTOL) aircraft 100, that may benefit from example implementations of the present disclosure. As shown, the VTOL aircraft generally includes a fuselage 102, wings 104 extending from opposing sides of the VTOL aircraft in a mid-section of the fuselage, and an empennage or tail assembly 106 at a rear end of the fuselage. Rotors 108 and 110 are mounted to respectively the wings and the end of the tail assembly for lifting and propelling the VTOL aircraft during flight.

FIG. 2 illustrates a system 200 according to some example implementations of the present disclosure. The system may include any of a number of different subsystems (each an individual system) for performing one or more functions or operations. As shown, in some examples, the system includes a control station 202, and one or more VTOL aircraft 204 that in some examples may correspond to VTOL aircraft 100. The control station provides facilities for communication with or control of the one or more VTOL aircraft, such as by wired or wireless data links directly or across one or more networks 206. In some examples, the control station may be a ground station, and not in all cases control the VTOL aircraft. In this regard, the control station may be configured to monitor the VTOL aircraft. The control station may initiate a mission, but the control station may not control the VTOL aircraft to maneuver. At times, then, the control station may enable or provide a distributed network/server of software functions.

The VTOL aircraft 204 may travel in at least one urban air mobility (UAM) environment 208 that includes at least one vertiport 210 that is designed for the VTOL aircraft to takeoff and land. Example implementations of the present disclosure provide a meteorological hub 212 for supporting flight operations of VTOL aircraft in the UAM environment that includes a vertiport. As shown, the meteorological hub is co-located with the control station 202, and may thereby communicate with the one or more VTOL aircraft directly or across the one or more networks 206. In other examples, the meteorological hub may be separate from the control station; and in at least some of these examples, the meteorological hub may communicate with one or more of the control stations or the VTOL aircraft directly or across the one or more networks. Similarly, either one or both the control station or the meteorological hub may be co-located with or separate from a vertiport of the at least one vertiport in the UAM environment.

The meteorological hub 212 is generally configured to access weather data from meterological equipment located on-site at the vertiport 210 and onboard the VTOL aircraft 204, fuse the weather data and produce a weather map that describes the weather, which may include one or more meteorological conditions. The meteorological hub may further incorporate weather data from various other ground-based weather information such as from weather stations, simulations, forecasts and the like, to build an even greater collection of weather data. The weather map, then, may present a spatio-temporal picture of atmospheric conditions relevant for flight operations.

In particular, the meteorological hub 212 is configured to access first observed weather data obtained by sensors 214 located on-site at the vertiport 210, and second observed weather data obtained by sensors 216 onboard VTOL aircraft 204. In this regard, the first observed weather data describes weather in an environment 218 of the vertiport that is within the UAM environment 208, and the second observed weather data describes the weather in the environment 220 of the VTOL aircraft. The meteorological hub is configured to perform a data fusion to integrate the first observed weather data and the second observed weather data to produce a collection of weather data that describes the weather in the environment of the vertiport, and the environment of the VTOL aircraft. In some examples, the meteorological hub is configured to perform the data fusion to integrate the first observed weather data and the second observed weather data that are from different sources, and differ in at least one of format or time scale.

The meteorological hub 212 is configured to produce a weather map 222 based on the collection of weather data, and for use in supporting flight operations of the VTOL aircraft. In this regard, the weather map illustrates one or more meteorological features of the weather in at least one of the environment 218 of the vertiport 210 or the environment 220 of the VTOL aircraft 204. The weather map may be expressed in a number of different manners to describe relationships between the environment of the vertiport and/or VTOL aircraft, and the one or more meteorological features of the weather in the environment. In some but not necessarily all implementations, the weather map may be expressed visually. In some of these implementations, the meteorological hub may be configured to generate a graphical user interface (GUI) 224 in which the weather map is produced, and to display the weather map in the GUI for use in supporting the flight operations of the VTOL aircraft.

In some examples, the meteorological hub 212 is further configured to determine feasibility of flight operations in the environment 220 of the VTOL aircraft 204 based on the collection of weather data; and in some of these examples, the GUI 224 further indicates the feasibility 226 of flight operations in the environment of the VTOL aircraft. Similarly, the meteorological hub may be configured to determine the feasibility 228 of flight operations in at least one of the environment 218 of the vertiport 210 or the UAM environment 208, which may be indicated in the GUI. The feasibility of flight operations may be determined in a number of different manners, such as based on a comparison of various weather data with respective thresholds; and in some examples, multiple thresholds may be set to indicate levels of feasibility.

In some examples, the meteorological hub is further configured to determine a risk of icing on the VTOL aircraft based on the collection of weather data, and the GUI further indicates the risk of icing 230. In this regard, the risk of icing may be determined from temperature and humidity in the environment, which complemented with monitoring flight performance (changes with weight which increases through ice aggregation) may enable icing detection and perhaps also trigger a contingency operation.

The weather map 222 may support flight operations in a number of different manners. The weather map may be sent to a flight control system onboard the VTOL aircraft 204 at which the weather map may be incorporated into autonomous or semi-autonomous flight control of the VTOL aircraft, such as to ensure a stable flight that anticipates weather-related events such as wind gusts. For the control station 202, the GUI 224 may provide dispatch with an integrated view on the situation with options to monitor and zoom in to individual VTOL aircraft, their status and the close environment they operate in. The meteorological hub 212 may support decision making and alert of notable situations detected in real time, as well as those further out (0.5, 2, 4, 6 . . . 24 hours) to facilitate efficient fleet management (e.g., relocation of VTOL aircraft). In this regard, the weather map may be used for educated decision making of the feasibility of flight operations, as well as for efficient fleet management including vehicle positioning at vertiports available for operations and for replanning of alternative means of travel.

FIG. 3 more particularly illustrates various components of the system 200 including examples of suitable sensors 214, 216, according to some example implementations of the present disclosure. In some examples, the first observed weather data accessed by the meteorological hub 212 includes one or more of temperature, humidity, pressure, wind speed and direction, obtained by one or more of the sensors that may be implemented by a weather station 302 located on-site at the vertiport 210. The first observed weather data may include wind speed and direction obtained by three-dimensional (3D) ultrasonic anemometers 304 or a wind profiler 306 located on-site at the vertiport 210. In this regard, 3D ultrasonic anemometers may be placed around the vertiport, and the wind profiler may be configured to use Doppler lidar to obtain a vertical wind profile and volume scan of 3D winds in the environment 218 of the vertiport.

In some examples, the first observed weather data may include a presence and determined type of hydrometeors (e.g., cloud, fog, mist, drizzle, rain, freezing rain, snow, hail ice/snow pellets) obtained by a present weather sensor (PWS) 308 located on-site at the vertiport 210. Additionally or alternatively, the first observed weather data may include a cloud ceiling in the environment 218 of the vertiport, obtained by a ceilometer 310 located on-site at the vertiport. Likewise, the first observed weather data may include a presence of lightning in the environment of the vertiport, obtained by a lightning detector 312 located on-site at the vertiport. Other examples of suitable sensors located on-site at the vertiport include a sensor 314 configured to measure a state of a surface of the vertiport, a temperature sensor 316 configured to measure a surface temperature of the surface of the vertiport, and the like.

Again, the second observed weather data is obtained by sensors 216 onboard VTOL aircraft 204, and describes the weather in the environment 220 of the VTOL aircraft. Similar to the first observed weather data, the second observed weather data may include one or more of temperature, humidity or pressure, obtained by respective one or more of the sensors 318, 320, 322 onboard the VTOL aircraft 204. Additionally or alternatively, the second observed weather data may include wind speed and direction obtained by one or more lidar sensors 324 onboard the VTOL aircraft. In this regard, the one or more lidar sensors may be configured to use airborne lidar to obtain a wind profile of the environment of the VTOL aircraft. In addition, at least one meteodrone 326 may be stationed at the vertiport 210, and include sensors configured to obtain at least some of the second observed weather data.

Returning to FIG. 2, in some examples, the second observed weather data is accessed for a fleet of VTOL aircraft 204 in the UAM environment 208. In some of these examples, at least some of the second observed weather data may be shared between at least two VTOL aircraft of the fleet. In some examples, at least some of the second observed weather data may be shared over a datalink 232 between the at least two VTOL aircraft. Additionally or alternatively, in some examples, at least some of the second observed weather data may be shared via the control station 202.

In addition to the first weather data and the second weather data, in some examples, the meteorological hub 212 may be further configured to access third weather data for the UAM environment 208, and that is at least one of observed or forecasted information. The meteorological hub, then, may be configured to perform the data fusion to integrate the first observed weather data, the second observed weather data, and the third weather data to produce the collection of weather data.

The third weather data may include weather data from a weather report obtained from a weather station 234 located remote from the vertiport 210. The weather station may provide weather data expressed as surface synoptic observations (SYNOP), a meterological aerodrome report (METAR), special (SPECI) weather report, or the like. Additionally or alternatively, the third weather data may include weather data from a prerun simulation such as a prerun large eddy simulation (LES) that describes turbulence in the UAM environment 208. Likewise, the third weather data may include weather data from mesoscale or microscale numerical weather prediction data for the UAM environment, or mesoscale or microscale radar and any storm track data for the UAM environment.

In some more particular examples, the third weather data may include forecast weather data for the UAM environment 208 over a time interval that is divided into a number of sub-intervals. In some of these examples, the meteorological hub 212 is further configured to determine the feasibility 228 of flight operations in at least one of the environment 218 of the vertiport 210 or the UAM environment 208 over the time interval based on the collection of weather data. And the GUI 224 that is generated may indicate the feasibility of flight operations for respective ones of the number of sub-intervals of the time interval.

Although example implementations of the present disclosure are suitable for one or more vertiports 210 in the UAM environment 208; in some examples, the meteorological hub 212 may be configured to access the first observed weather data for a network of vertiports in the UAM environment. Similarly, the meteorological hub may be configured to access the second observed weather data for a fleet of VTOL aircraft 204 in the UAM environment. In some of these examples, then, the meteorological hub may be configured to produce the weather map 222 that illustrates the one or more meteorological features of the weather for selectively the environment 218 of the vertiport 210, the environment 220 of the VTOL aircraft 204, or the UAM environment that includes the network of vertiports or the fleet of VTOL aircraft.

FIGS. 4 and 5 illustrate a GUI 400 that may correspond to GUI 224, according to some example implementations of the present disclosure. The GUI may selectively cover up to a UAM environment 208 with a network of vertiports 210 (labeled VP1, VP2, VP3, VP4 and VP5), and a fleet of VTOL aircraft 204 (labeled V1-V15, and of which V1, V3, V4, V5 and V8 are shown in the weather map). In other examples, however, the GUI may cover an even larger environment that includes one or more UAM environments.

As shown, the GUI 400 includes a weather map 402 (e.g., weather map 222) that illustrates selected meteorological features of the weather in a selected environment. The GUI includes a menu 404 from which meteorological features of the weather may be selected, as well as the environment. In FIGS. 4 and 5, the weather map illustrates observed mesoscale radar (weather radar) 406 for the UAM environment, and includes a mesoscale weather forecast (nowcasting) 408 for the UAM environment. The weather map as shown in FIG. 4 illustrates the UAM environment 208 (network view), and the weather map as shown in FIG. 5 illustrates the environment 220 of one of the VTOL aircraft (V1).

The GUI 400 may also include a vehicle status 410 of VTOL aircraft 204 of the fleet. The vehicle status may indicate which of the VTOL aircraft are in flight, and which are grounded, such as by different color-coded blocks 412. The vehicle status may also indicate feasibility of flight operations in the environment of the VTOL aircraft 204, which may correspond to the feasibility 226 of flight operations described above. In the illustrated example, the feasibility of flight operations are shown by color-coded outline 414 of the blocks for those of the VTOL aircraft in flight. Likewise, the GUI may include a vertiport status 416 that indicates the feasibility (e.g., feasibility 228) of flight operations in the UAM environment 208 for a number of sub-intervals of a twenty-four hour time interval, such as by color-coded blocks 418 for respective ones of the sub-intervals.

In FIG. 5 in which the environment 220 of one of the VTOL aircraft (V1) is selected in the menu 404, the weather map 402 may be focused on that environment. The GUI 400 may further present various infographics and other information for the VTOL aircraft. This may include infographics 520, 522 that indicate wind and temperature along a route of the VTOL aircraft, which may be color-coded to indicate a level of risk to flight operations for the VTOL aircraft. The GUI may further provide a risk status for the VTOL aircraft that indicates an impact on flight operations for various factors such as arrival vertiport status, alternate vertiport status, closest emergency landing zone (ELZ) status, turbulence, icing, storm proximity and the like. Similar to other information in the GUI, these may be presented in respective color-coded blocks 524.

FIGS. 6A-6F are flowcharts illustrating various steps in a method 600 of supporting flight operations of vertical take-off and landing (VTOL) aircraft in an urban air mobility (UAM) environment that includes a vertiport, according to various example implementations of the present disclosure. The method includes accessing first observed weather data obtained by sensors located on-site at the vertiport, the first observed weather data describing weather in an environment of the vertiport that is within the UAM environment, as shown at block 602 of FIG. 6A. The method includes accessing second observed weather data obtained by sensors onboard VTOL aircraft, the second observed weather data describing the weather in the environment of the VTOL aircraft, as shown at block 604. The method includes performing a data fusion to integrate the first observed weather data and the second observed weather data to produce a collection of weather data that describes the weather in the environment of the vertiport, and the environment of the VTOL aircraft, as shown at block 606. And the method includes producing a weather map based on the collection of weather data, the weather map illustrating one or more meteorological features of the weather in at least one of the environment of the vertiport or the environment of the VTOL aircraft, the weather map produced for use in supporting flight operations of the VTOL aircraft, as shown at block 608.

In some examples, the method 600 further includes generating a graphical user interface (GUI) in which the weather map is produced, as shown at block 610 of FIG. 6B. And the method includes displaying the weather map in the GUI for use in supporting the flight operations of the VTOL aircraft, as shown at block 612.

In some examples, the method 600 further includes determining feasibility of flight operations in the environment of the VTOL aircraft based on the collection of weather data, as shown at block 614 of FIG. 6C. In some of these examples, the GUI that is generated at block 610 further indicates the feasibility of flight operations in the environment of the VTOL aircraft.

In some examples, the method 600 further includes determining a risk of icing on the VTOL aircraft based on the collection of weather data, as shown at block 616 of FIG. 6D. In some of these examples, the GUI that is generated at block 610 further indicates the risk of icing.

In some examples, the data fusion is performed at block 606 to integrate the first observed weather data and the second observed weather data that are from different sources, and differ in at least one of format or time scale.

In some examples, the first observed weather data includes one or more of temperature, humidity, pressure, wind speed and direction, obtained by one or more of the sensors located on-site at the vertiport.

In some examples, the first observed weather data includes wind speed and direction obtained by three-dimensional (3D) ultrasonic anemometers or a wind profiler located on-site at the vertiport, the wind profiler configured to use Doppler lidar to obtain a vertical wind profile and volume scan of 3D winds in the environment of the vertiport.

In some examples, the first observed weather data includes one or more of a presence and determined type of hydrometeors obtained by a present weather sensor (PWS) located on-site at the vertiport, a cloud ceiling in the environment of the vertiport, obtained by a ceilometer located on-site at the vertiport, or a presence of lightning in the environment of the vertiport, obtained by a lightning detector located on-site at the vertiport.

In some examples, the second observed weather data is accessed at block 604 for a fleet of VTOL aircraft in the UAM environment, at least some of the second observed weather data shared between at least two VTOL aircraft of the fleet.

In some examples, the second observed weather data includes one or more of temperature, humidity or pressure, obtained by one or more of the sensors onboard the VTOL aircraft.

In some examples, the second observed weather data includes wind speed and direction obtained by one or more lidar sensors onboard the VTOL aircraft, the one or more lidar sensors configured to use airborne lidar to obtain a wind profile of the environment of the VTOL aircraft.

In some examples, the method 600 further includes accessing third weather data for the UAM environment, and that is at least one of observed or forecasted information, as shown at block 618 of FIG. 6E. In some of these examples, the data fusion is performed at block 606 to integrate the first observed weather data, the second observed weather data, and the third weather data to produce the collection of weather data.

In some examples, the third weather data includes one or more weather data from a weather report obtained from a weather station located remote from the vertiport, a prerun simulation that describes turbulence in the UAM environment, mesoscale or microscale numerical weather prediction data for the UAM environment, or mesoscale or microscale radar and any storm track data for the UAM environment.

In some examples, the third weather data includes forecast weather data for the UAM environment over a time interval that is divided into a number of sub-intervals. The method 600 further includes determining feasibility of flight operations in at least one of the environment of the vertiport or the UAM environment over the time interval based on the collection of weather data, as shown at block 620 of FIG. 6F. And the method includes generating a graphical user interface (GUI) in which the weather map is produced, and that indicates the feasibility of flight operations for respective ones of the number of sub-intervals of the time interval, as shown at block 622.

In some examples, the first observed weather data is accessed at block 602 for a network of vertiports in the UAM environment, and the second observed weather data is accessed at block 604 for a fleet of VTOL aircraft in the UAM environment. In some of these examples, the weather map that is produced at block 608 illustrates the one or more meteorological features of the weather for selectively the environment of the vertiport, the environment of the VTOL aircraft, or the UAM environment that includes the network of vertiports or the fleet of VTOL aircraft.

According to example implementations of the present disclosure, the meteorological hub 212 may be implemented by various means. Means for implementing the meteorological hub may include hardware, alone or under direction of one or more computer programs from a computer-readable storage medium. In some examples, one or more apparatuses may be configured to function as or otherwise implement the meteorological hub shown and described herein. In examples involving more than one apparatus, the respective apparatuses may be connected to or otherwise in communication with one another in a number of different manners, such as directly or indirectly via a wired or wireless network or the like.

FIG. 7 illustrates an apparatus 700 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 702 (e.g., processor unit) connected to a memory 704 (e.g., storage device).

The processing circuitry 702 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 704 (of the same or another apparatus).

The processing circuitry 702 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 704 is generally any piece of computer hardware that is capable of storing information such as, for example, data, computer programs (e.g., computer-readable program code 706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 704, the processing circuitry 702 may also be connected to one or more interfaces for displaying, transmitting and/or receiving information. The interfaces may include a communications interface 708 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 710 and/or one or more user input interfaces 712 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 700 may include a processing circuitry 702 and a computer-readable storage medium or memory 704 coupled to the processing circuitry, where the processing circuitry is configured to execute computer-readable program code 706 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for supporting flight operations of vertical takeoff and landing (VTOL) aircraft in an urban air mobility (UAM) environment that includes a vertiport, the apparatus comprising: a memory configured to store computer-readable program code; and processing circuitry configured to access the memory, and execute the computer-readable program code to cause the apparatus to at least: access first observed weather data obtained by sensors located on-site at the vertiport, the first observed weather data describing weather in an environment of the vertiport that is within the UAM environment; access second observed weather data obtained by sensors onboard VTOL aircraft, the second observed weather data describing the weather in the environment of the VTOL aircraft; perform a data fusion to integrate the first observed weather data and the second observed weather data to produce a collection of weather data that describes the weather in the environment of the vertiport, and the environment of the VTOL aircraft; and produce a weather map based on the collection of weather data, the weather map illustrating one or more meteorological features of the weather in at least one of the environment of the vertiport or the environment of the VTOL aircraft, the weather map produced for use in supporting flight operations of the VTOL aircraft.

Clause 2. The apparatus of clause 1, wherein the processing circuitry is configured to execute the computer-readable program code to cause the apparatus to further at least: generate a graphical user interface (GUI) in which the weather map is produced; and display the weather map in the GUI for use in supporting the flight operations of the VTOL aircraft.

Clause 3. The apparatus of clause 2, wherein the processing circuitry is configured to execute the computer-readable program code to cause the apparatus to further determine feasibility of flight operations in the environment of the VTOL aircraft based on the collection of weather data, and wherein the GUI that is generated further indicates the feasibility of flight operations in the environment of the VTOL aircraft.

Clause 4. The apparatus of clause 2 or clause 3, wherein the processing circuitry is configured to execute the computer-readable program code to cause the apparatus to further determine a risk of icing on the VTOL aircraft based on the collection of weather data, and wherein the GUI that is generated further indicates the risk of icing.

Clause 5. The apparatus of any of clauses 1 to 4, wherein the data fusion is performed to integrate the first observed weather data and the second observed weather data that are from different sources, and differ in at least one of format or time scale.

Clause 6. The apparatus of any of clauses 1 to 5, wherein the first observed weather data includes one or more of temperature, humidity, pressure, wind speed and direction, obtained by one or more of the sensors located on-site at the vertiport.

Clause 7. The apparatus of any of clauses 1 to 6, wherein the first observed weather data includes wind speed and direction obtained by three-dimensional (3D) ultrasonic anemometers or a wind profiler located on-site at the vertiport, the wind profiler configured to use Doppler lidar to obtain a vertical wind profile and volume scan of 3D winds in the environment of the vertiport.

Clause 8. The apparatus of any of clauses 1 to 7, wherein the first observed weather data includes one or more of a presence and determined type of hydrometeors obtained by a present weather sensor (PWS) located on-site at the vertiport, a cloud ceiling in the environment of the vertiport, obtained by a ceilometer located on-site at the vertiport, or a presence of lightning in the environment of the vertiport, obtained by a lightning detector located on-site at the vertiport.

Clause 9. The apparatus of any of clauses 1 to 8, wherein the second observed weather data is accessed for a fleet of VTOL aircraft in the UAM environment, at least some of the second observed weather data shared between at least two VTOL aircraft of the fleet.

Clause 10. The apparatus of any of clauses 1 to 9, wherein the second observed weather data includes one or more of temperature, humidity or pressure, obtained by one or more of the sensors onboard the VTOL aircraft.

Clause 11. The apparatus of any of clauses 1 to 10, wherein the second observed weather data includes wind speed and direction obtained by one or more lidar sensors onboard the VTOL aircraft, the one or more lidar sensors configured to use airborne lidar to obtain a wind profile of the environment of the VTOL aircraft.

Clause 12. The apparatus of any of clauses 1 to 11, wherein the processing circuitry is configured to execute the computer-readable program code to cause the apparatus to further access third weather data for the UAM environment, and that is at least one of observed or forecasted information, and wherein the data fusion is performed to integrate the first observed weather data, the second observed weather data, and the third weather data to produce the collection of weather data.

Clause 13. The apparatus of clause 12, wherein the third weather data includes one or more weather data from a weather report obtained from a weather station located remote from the vertiport, a prerun simulation that describes turbulence in the UAM environment, mesoscale or microscale numerical weather prediction data for the UAM environment, or mesoscale or microscale radar and any storm track data for the UAM environment.

Clause 14. The apparatus of clause 12 or clause 13, wherein the third weather data includes forecast weather data for the UAM environment over a time interval that is divided into a number of sub-intervals, and the processing circuitry is configured to execute the computer-readable program code to cause the apparatus to further at least: determine feasibility of flight operations in at least one of the environment of the vertiport or the UAM environment over the time interval based on the collection of weather data; and generate a graphical user interface (GUI) in which the weather map is produced, and that indicates the feasibility of flight operations for respective ones of the number of sub-intervals of the time interval.

Clause 15. The apparatus of any of clauses 1 to 14, wherein the first observed weather data is accessed for a network of vertiports in the UAM environment, and the second observed weather data is accessed for a fleet of VTOL aircraft in the UAM environment, and wherein the weather map that is produced illustrates the one or more meteorological features of the weather for selectively the environment of the vertiport, the environment of the VTOL aircraft, or the UAM environment that includes the network of vertiports or the fleet of VTOL aircraft.

Clause 16. A method of supporting flight operations of vertical takeoff and landing (VTOL) aircraft in an urban air mobility (UAM) environment that includes a vertiport, the method comprising: accessing first observed weather data obtained by sensors located on-site at the vertiport, the first observed weather data describing weather in an environment of the vertiport that is within the UAM environment; accessing second observed weather data obtained by sensors onboard VTOL aircraft, the second observed weather data describing the weather in the environment of the VTOL aircraft; performing a data fusion to integrate the first observed weather data and the second observed weather data to produce a collection of weather data that describes the weather in the environment of the vertiport, and the environment of the VTOL aircraft; and producing a weather map based on the collection of weather data, the weather map illustrating one or more meteorological features of the weather in at least one of the environment of the vertiport or the environment of the VTOL aircraft, the weather map produced for use in supporting flight operations of the VTOL aircraft.

Clause 17. The method of clause 16, wherein the method further comprises: generating a graphical user interface (GUI) in which the weather map is produced; and displaying the weather map in the GUI for use in supporting the flight operations of the VTOL aircraft.

Clause 18. The method of clause 17, wherein the method further comprises determining feasibility of flight operations in the environment of the VTOL aircraft based on the collection of weather data, and wherein the GUI that is generated further indicates the feasibility of flight operations in the environment of the VTOL aircraft.

Clause 19. The method of clause 17 or clause 18, wherein the method further comprises determining a risk of icing on the VTOL aircraft based on the collection of weather data, and wherein the GUI that is generated further indicates the risk of icing.

Clause 20. The method of any of clauses 16 to 19, wherein the data fusion is performed to integrate the first observed weather data and the second observed weather data that are from different sources, and differ in at least one of format or time scale.

Clause 21. The method of any of clauses 16 to 20, wherein the first observed weather data includes one or more of temperature, humidity, pressure, wind speed and direction, obtained by one or more of the sensors located on-site at the vertiport.

Clause 22. The method of any of clauses 16 to 21, wherein the first observed weather data includes wind speed and direction obtained by three-dimensional (3D) ultra-sonic anemometers or a wind profiler located on-site at the vertiport, the wind profiler configured to use Doppler lidar to obtain a vertical wind profile and volume scan of 3D winds in the environment of the vertiport.

Clause 23. The method of any of clauses 16 to 22, wherein the first observed weather data includes one or more of a presence and determined type of hydrometeors obtained by a present weather sensor (PWS) located on-site at the vertiport, a cloud ceiling in the environment of the vertiport, obtained by a ceilometer located on-site at the vertiport, or a presence of lightning in the environment of the vertiport, obtained by a lightning detector located on-site at the vertiport.

Clause 24. The method of any of clauses 16 to 23, wherein the second observed weather data is accessed for a fleet of VTOL aircraft in the UAM environment, at least some of the second observed weather data shared between at least two VTOL aircraft of the fleet.

Clause 25. The method of any of clauses 16 to 24, wherein the second observed weather data includes one or more of temperature, humidity or pressure, obtained by one or more of the sensors onboard the VTOL aircraft.

Clause 26. The method of any of clauses 16 to 25, wherein the second observed weather data includes wind speed and direction obtained by one or more lidar sensors onboard the VTOL aircraft, the one or more lidar sensors configured to use airborne lidar to obtain a wind profile of the environment of the VTOL aircraft.

Clause 27. The method of any of clauses 16 to 26, wherein the method further comprises accessing third weather data for the UAM environment, and that is at least one of observed or forecasted information, and wherein the data fusion is performed to integrate the first observed weather data, the second observed weather data, and the third weather data to produce the collection of weather data.

Clause 28. The method of clause 27, wherein the third weather data includes one or more weather data from a weather report obtained from a weather station located remote from the vertiport, a prerun simulation that describes turbulence in the UAM environment, mesoscale or microscale numerical weather prediction data for the UAM environment, or mesoscale or microscale radar and any storm track data for the UAM environment.

Clause 29. The method of clause 27 or clause 28, wherein the third weather data includes forecast weather data for the UAM environment over a time interval that is divided into a number of sub-intervals, and the method further comprises: determining feasibility of flight operations in at least one of the environment of the vertiport or the UAM environment over the time interval based on the collection of weather data; and generating a graphical user interface (GUI) in which the weather map is produced, and that indicates the feasibility of flight operations for respective ones of the number of sub-intervals of the time interval.

Clause 30. The method of any of clauses 16 to 29, wherein the first observed weather data is accessed for a network of vertiports in the UAM environment, and the second observed weather data is accessed for a fleet of VTOL aircraft in the UAM environment, and wherein the weather map that is produced illustrates the one or more meteorological features of the weather for selectively the environment of the vertiport, the environment of the VTOL aircraft, or the UAM environment that includes the network of vertiports or the fleet of VTOL aircraft.

Clause 31. A computer-readable storage medium for supporting flight operations of vertical takeoff and landing (VTOL) aircraft in an urban air mobility (UAM) environment that includes a vertiport, the computer-readable storage medium being non-transitory and having computer-readable program code stored therein that, in response to execution by processing circuitry, causes an apparatus to at least: access first observed weather data obtained by sensors located on-site at the vertiport, the first observed weather data describing weather in an environment of the vertiport that is within the UAM environment; access second observed weather data obtained by sensors onboard VTOL aircraft, the second observed weather data describing the weather in the environment of the VTOL aircraft; perform a data fusion to integrate the first observed weather data and the second observed weather data to produce a collection of weather data that describes the weather in the environment of the vertiport, and the environment of the VTOL aircraft; and produce a weather map based on the collection of weather data, the weather map illustrating one or more meteorological features of the weather in at least one of the environment of the vertiport or the environment of the VTOL aircraft, the weather map produced for use in supporting flight operations of the VTOL aircraft.

Clause 32. The computer-readable storage medium of clause 31, wherein the computer-readable storage medium has further computer-readable program code stored therein that, in response to execution by the processing circuitry, causes the apparatus to further at least: generate a graphical user interface (GUI) in which the weather map is produced; and display the weather map in the GUI for use in supporting the flight operations of the VTOL aircraft.

Clause 33. The computer-readable storage medium of clause 32, wherein the computer-readable storage medium has further computer-readable program code stored therein that, in response to execution by the processing circuitry, causes the apparatus to further determine feasibility of flight operations in the environment of the VTOL aircraft based on the collection of weather data, and wherein the GUI that is generated further indicates the feasibility of flight operations in the environment of the VTOL aircraft.

Clause 34. The computer-readable storage medium of clause 32 or clause 33, wherein the computer-readable storage medium has further computer-readable program code stored therein that, in response to execution by the processing circuitry, causes the apparatus to further determine a risk of icing on the VTOL aircraft based on the collection of weather data, and wherein the GUI that is generated further indicates the risk of icing.

Clause 35. The computer-readable storage medium of any of clauses 31 to 34, wherein the data fusion is performed to integrate the first observed weather data and the second observed weather data that are from different sources, and differ in at least one of format or time scale.

Clause 36. The computer-readable storage medium of any of clauses 31 to 35, wherein the first observed weather data includes one or more of temperature, humidity, pressure, wind speed and direction, obtained by one or more of the sensors located on-site at the vertiport.

Clause 37. The computer-readable storage medium of any of clauses 31 to 36, wherein the first observed weather data includes wind speed and direction obtained by three-dimensional (3D) ultrasonic anemometers or a wind profiler located on-site at the vertiport, the wind profiler configured to use Doppler lidar to obtain a vertical wind profile and volume scan of 3D winds in the environment of the vertiport.

Clause 38. The computer-readable storage medium of any of clauses 31 to 37, wherein the first observed weather data includes one or more of a presence and determined type of hydrometeors obtained by a present weather sensor (PWS) located on-site at the vertiport, a cloud ceiling in the environment of the vertiport, obtained by a ceilometer located on-site at the vertiport, or a presence of lightning in the environment of the vertiport, obtained by a lightning detector located on-site at the vertiport.

Clause 39. The computer-readable storage medium of any of clauses 31 to 38, wherein the second observed weather data is accessed for a fleet of VTOL aircraft in the UAM environment, at least some of the second observed weather data shared between at least two VTOL aircraft of the fleet.

Clause 40. The computer-readable storage medium of any of clauses 31 to 39, wherein the second observed weather data includes one or more of temperature, humidity or pressure, obtained by one or more of the sensors onboard the VTOL aircraft.

Clause 41. The computer-readable storage medium of any of clauses 31 to 40, wherein the second observed weather data includes wind speed and direction obtained by one or more lidar sensors onboard the VTOL aircraft, the one or more lidar sensors configured to use airborne lidar to obtain a wind profile of the environment of the VTOL aircraft.

Clause 42. The computer-readable storage medium of any of clauses 31 to 41, wherein the computer-readable storage medium has further computer-readable program code stored therein that, in response to execution by the processing circuitry, causes the apparatus to further access third weather data for the UAM environment, and that is at least one of observed or forecasted information, and wherein the data fusion is performed to integrate the first observed weather data, the second observed weather data, and the third weather data to produce the collection of weather data.

Clause 43. The computer-readable storage medium of clause 42, wherein the third weather data includes one or more weather data from a weather report obtained from a weather station located remote from the vertiport, a prerun simulation that describes turbulence in the UAM environment, mesoscale or microscale numerical weather prediction data for the UAM environment, or mesoscale or microscale radar and any storm track data for the UAM environment.

Clause 44. The computer-readable storage medium of clause 42 or clause 43, wherein the third weather data includes forecast weather data for the UAM environment over a time interval that is divided into a number of sub-intervals, and the computer-readable storage medium has further computer-readable program code stored therein that, in response to execution by the processing circuitry, causes the apparatus to further at least: determine feasibility of flight operations in at least one of the environment of the vertiport or the UAM environment over the time interval based on the collection of weather data; and generate a graphical user interface (GUI) in which the weather map is produced, and that indicates the feasibility of flight operations for respective ones of the number of sub-intervals of the time interval.

Clause 45. The computer-readable storage medium of any of clauses 31 to 44, wherein the first observed weather data is accessed for a network of vertiports in the UAM environment, and the second observed weather data is accessed for a fleet of VTOL aircraft in the UAM environment, and wherein the weather map that is produced illustrates the one or more meteorological features of the weather for selectively the environment of the vertiport, the environment of the VTOL aircraft, or the UAM environment that includes the network of vertiports or the fleet of VTOL aircraft.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting flight operations of a vertical takeoff and landing (VTOL) vehicle, the apparatus comprising:
a memory configured to store computer-readable program code; and
processing circuitry configured to access the memory, and execute the computer-readable program code to cause the apparatus to at least:
access first observed weather data obtained by at least one sensor located at a vertiport which describes weather in an environment of the vertiport;
access second observed weather data obtained by at least one sensor of the VTOL vehicle which describes weather in an environment of the VTOL vehicle;
integrate the first observed weather data and the second observed weather data to produce a collection of weather data; and
produce a weather map based on the collection of weather data, the weather map illustrating one or more meteorological features of the weather in at least one of the environment of the vertiport or the environment of the VTOL vehicle, the weather map produced for use in supporting the flight operations of the VTOL vehicle.

2. The apparatus of claim 1, wherein the processing circuitry is configured to execute the computer-readable program code to cause the apparatus to further at least:

generate a graphical user interface (GUI) in which the weather map is produced; and
display the weather map in the GUI for use in supporting the flight operations of the VTOL vehicle at the vertiport.

3. The apparatus of claim 2, wherein the processing circuitry is configured to execute the computer-readable program code to cause the apparatus to further determine feasibility of flight operations in the environment of the VTOL vehicle based on the collection of weather data, and
wherein the GUI that is generated further indicates the feasibility of flight operations in the environment of the VTOL vehicle.

4. The apparatus of claim 2, wherein the processing circuitry is configured to execute the computer-readable program code to cause the apparatus to further determine a risk of icing on the VTOL vehicle based on the collection of weather data, and
wherein the GUI that is generated further indicates the risk of icing.

5. The apparatus of claim 1, wherein the at least one sensor located at the vertiport is further defined as a plurality of sensors, and wherein the first observed weather data includes one or more of temperature, humidity, pressure, wind speed and direction, obtained by one or more of the sensors located at the vertiport.

6. The apparatus of claim 1, wherein the first observed weather data includes wind speed and direction obtained by three-dimensional (3D) ultrasonic anemometers or a wind profiler located at the vertiport, the wind profiler configured to use Doppler lidar to obtain a vertical wind profile and volume scan of 3D winds in the environment of the vertiport.

7. The apparatus of claim 1, wherein the first observed weather data includes one or more of a presence and determined type of hydrometeors obtained by a present weather sensor (PWS) located at the vertiport, a cloud ceiling in the environment of the vertiport, obtained by a ceilometer located at the vertiport, or a presence of lightning in the environment of the vertiport, obtained by a lightning detector located at the vertiport.

8. The apparatus of claim 1, wherein the at least one sensor of the VTOL vehicle is further defined as a plurality of sensors, and wherein the second observed weather data includes one or more of temperature, humidity or pressure, obtained by one or more of the sensors of the VTOL vehicle, and
wherein the second observed weather data includes wind speed and direction obtained by one or more lidar sensors of the VTOL vehicle, the one or more lidar sensors configured to use airborne lidar to obtain a wind profile of the environment of the VTOL vehicle.

9. The apparatus of claim 1, wherein the processing circuitry is configured to execute the computer-readable program code to cause the apparatus to further access third weather data, and that is at least one of observed or forecasted information, and
wherein integrating the first observed weather data and the second observed weather data further comprises integrating the third weather data to produce the collection of weather data.

10. The apparatus of claim 9, wherein the third weather data includes one or more weather data from a weather report obtained from a weather station located remote from the vertiport, a prerun simulation that describes turbulence, mesoscale or microscale numerical weather prediction data, or mesoscale or microscale radar and any storm track data.

11. A method of supporting flight operations of vertical takeoff and landing (VTOL) vehicle, the method comprising:

accessing first observed weather data obtained by at least one sensor located at a vertiport which describes weather in an environment of the vertiport;

accessing second observed weather data obtained by at least one sensor of the VTOL vehicle which describes weather in an environment of the VTOL vehicle;

integrating the first observed weather data and the second observed weather data to produce a collection of weather data; and producing a weather map based on the collection of weather data, the weather map illustrating one or more meteorological features of the weather in at least one of the environment of the vertiport or the environment of the VTOL vehicle, the weather map produced for use in supporting the flight operations of the VTOL vehicle.

12. The method of claim 11, wherein the method further comprises:

generating a graphical user interface (GUI) in which the weather map is produced; and displaying the weather map in the GUI for use in supporting the flight operations of the VTOL vehicle at the vertiport.

13. The method of claim 12, wherein the method further comprises determining feasibility of flight operations in the environment of the VTOL vehicle based on the collection of weather data, and wherein the GUI that is generated further indicates the feasibility of flight operations in the environment of the VTOL vehicle.

14. The method of claim 12, wherein the method further comprises determining a risk of icing on the VTOL vehicle based on the collection of weather data, and wherein the GUI that is generated further indicates the risk of icing.

15. The method of claim 11, wherein the at least one sensor located at the vertiport is further defined as a plurality of sensors, and wherein the first observed weather data includes one or more of temperature, humidity, pressure, wind speed and direction, obtained by one or more of the sensors located at the vertiport.

16. The method of claim 11, wherein the first observed weather data includes wind speed and direction obtained by three-dimensional (3D) ultrasonic anemometers or a wind profiler located at the vertiport, the wind profiler configured to use Doppler lidar to obtain a vertical wind profile and volume scan of 3D winds in the environment of the vertiport.

17. The method of claim 11, wherein the first observed weather data includes one or more of a presence and determined type of hydrometeors obtained by a present weather sensor (PWS) located at the vertiport, a cloud ceiling in the environment of the vertiport, obtained by a ceilometer located at the vertiport, or a presence of lightning in the environment of the vertiport, obtained by a lightning detector located at the vertiport.

18. The method of claim 11, wherein the at least one sensor of the VTOL vehicle is further defined as a plurality of sensors, and wherein the second observed weather data includes one or more of temperature, humidity or pressure, obtained by one or more of the sensors of the VTOL vehicle, and wherein the second observed weather data includes wind speed and direction obtained by one or more lidar sensors of the VTOL vehicle, the one or more lidar sensors configured to use airborne lidar to obtain a wind profile of the environment of the VTOL vehicle.

19. The method of claim 11, wherein the method further comprises accessing third weather data, and that is at least one of observed or forecasted information, and wherein integrating the first observed weather data and the second observed weather data further comprises integrating the third weather data to produce the collection of weather data.

20. A computer-readable storage medium for supporting flight operations of a vertical takeoff and landing (VTOL) aircraft, the computer-readable storage medium being non-transitory and having computer-readable program code stored therein that, in response to execution by processing circuitry, causes an apparatus to at least:

access first observed weather data obtained by sensors located at a vertiport which describe weather in an environment of the vertiport;

access second observed weather data obtained by sensors of the VTOL aircraft which describe weather in an environment of the VTOL aircraft;

integrate the first observed weather data and the second observed weather data to produce a collection of weather data that is indicative of the weather in the environment of the vertiport and the environment of the VTOL aircraft; and produce a weather map based on the collection of weather data, the weather map illustrating one or more meteorological features of the weather in at least one of the environment of the vertiport or the environment of the VTOL aircraft, the weather map produced for use in supporting the flight operations of the VTOL aircraft.

* * * * *